Patented Jan. 26, 1937

2,068,979

UNITED STATES PATENT OFFICE 2,068,979

METHOD OF PREVENTING CORROSION IN OIL STILLS

Gerald M. Fisher, Los Angeles, Calif., assignor to Socony-Vacuum Oil Company, Incorporated, New York, N. Y., a corporation of New York No Drawing. Application January 20, 1936, Serial No. 59,903

3 Claims. (Cl. 196—35)

The corrosion of oil stills and of their condesing equipment by acid vapors produced in the distillation of both crude and acid treated petroleums is a serious source of expense to petroleum refiners. These vapors are commonly of either hydrochloric or sulfurous acid, originating in soluble chlorids present in crude or in sulfur compounds which are likely to occur either in crude or in acid treated oils. Many substances designed to neutralize these vapors after their generation have been proposed and such materials as calcium hydroxide and ammonia have been extensively used, but such materials are disadvantageous in that they are entirely insoluble in the oil, are difficult to maintain in contact with the hot oil mass if they are added to the oil itself, and are awkward to feed in proper proportion if they are introduced into the oil vapor.

I propose to add to the oil to be distilled a small proportion of a metallic naphthenate which is completely soluble in the oil, calcium naphthenate being preferable because of its low cost though the naphthenates of other alkaline earths are also available.

The metallic naphthenates may best be produced by direct reaction between the constituents, as by the method described in my copending application filed January 20, 1936 under Serial No. 59,900. In this method, calcium hydroxide or other metallic oxide or hydroxide in finely powdered form is mixed with the naphthenic acid, allowed to complete the reaction in the cold and then heated to say 250° Fahr. with constant stirring until dehydrated. It is highly desirable to first thoroughly wet the powder with a relatively small proportion of the oil to be treated in order to dampen its particles and prevent the formation of balls of the powder surrounded by skins of metallic naphthenate, such balls being almost impossible to break up so as to bring their contents into the reaction. It may be desirable to add sufficient oil to the reaction product to bring it to a fluid condition for greater ease of measurement and for more ready addition to the oil to be treated.

As these naphthenates are completely and readily soluble in most crude petroleums and petroleum products they diffuse permanently into an oil mass or oil stream in process of heating and distillation, and the metal of the naphthenate is thereby made completely available for combination with free acids, the acid radicles of unstable sulfites and sulfonates, the sulfur of mercaptans or other organic sulfids, and chlorin or hydrochloric acid which may be produced by reactions involving the mineral salts present in crudes. The calcium or other metallic sulfids and chlorids thus formed are retained in the residuum of the distillation, as is also (in large part) the naphthenic acid set free in the deacidifying reaction, and the formation of acid, sulfurous or other corrosive vapors is positively prevented. The alkali-earth napthenates also perform a "sweetening" function in the distillation of sulfurous petroleums, as is disclosed in my copending application Serial No. 59,902, filed January 20, 1936.

While I do not restrict myself to any particular type of naphthenic acids for producing the naphthenates used in this process, I find it economical to use acids of low molecular weight, such as are obtained from gasoline and kerosene distillates, because of the larger proportionate quantity of the active metal which they will bring into solution.

I claim as my invention:

1. The method of preventing the corrosion of oil stills which comprises supplying to the oil being distilled a small proportion of an oil-soluble naphthenate of an alkali earth metal.
2. The method of preventing the corrosion of oil stills which comprises supplying to the oil being distilled a small proportion of calcium napthenate.
3. In the distillation of petroleum, the step of introducing an oil-soluble naphthenate of an alkali earth metal to said petroleum prior to the completion of said distillation.

GERALD M. FISHER.